(12) United States Patent
Chang

(10) Patent No.: US 7,423,815 B2
(45) Date of Patent: Sep. 9, 2008

(54) ADJUSTABLE LENS DEVICE

(75) Inventor: Ming-Hsin Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 59 days.

(21) Appl. No.: 11/701,195

(22) Filed: Jan. 31, 2007

(65) Prior Publication Data

US 2007/0183026 A1    Aug. 9, 2007

(30) Foreign Application Priority Data

Feb. 7, 2006    (TW) ............................... 95104056 A

(51) Int. Cl.
*G02B 15/14* (2006.01)
(52) U.S. Cl. .................. 359/699; 359/694; 359/823
(58) Field of Classification Search ......... 359/694–701, 359/823
See application file for complete search history.

(56) References Cited

U.S. PATENT DOCUMENTS 6,661,589 B2 * 12/2003 Takanashi et al. ........... 359/819

\* cited by examiner

*Primary Examiner*—Hung X. Dang
*Assistant Examiner*—Vipin M Patel
(74) *Attorney, Agent, or Firm*—DLA Piper US LLP

(57) ABSTRACT

An adjustable lens device includes a fixing seat, an adjusting seat sleeved on the fixing seat, and first and second lens modules mounted to the fixing seat. The fixing seat is formed with a plurality of positioning projections, and a plurality of guide slots that extend parallel to an axis. The adjusting seat is formed with an annular groove for movably receiving the positioning projections, and a plurality of driving slots that extend spirally and that correspond to the guide slots. Guide components on the second lens module pass through the guide slots and the driving slots. By virtue of the guide slots, the driving slots and the guide components, rotation of the adjusting seat relative to the fixing seat can move the second lens module for zoom adjustment.

8 Claims, 5 Drawing Sheets

ADJUSTABLE LENS DEVICE

CROSS-REFERENCE TO RELATED APPLICATION

This application claims priority of Taiwanese application No. 095104056, filed on Feb. 7, 2006.

BACKGROUND OF THE INVENTION

1. Field of the Invention

The invention relates to a lens, more particularly to an adjustable lens device for optical equipment.

2. Description of the Related Art

As shown in FIGS. 1 and 2, a conventional adjustable zoom lens device for a projector includes a fixing seat 1, an adjusting seat 2 sleeved inside the fixing seat 1, a front lens module 3 mounted to a front end portion of the fixing seat 1, and a rear lens module 4 mounted to a rear end portion of the fixing seat 1. The fixing seat 1 is in a form of a tube with a stepped configuration, and is formed with two sets of guide slots 101 extending parallel to an axis, and a set of limiting slots 102 extending along the rim adjacent to the guide slots 101. The adjusting seat 2 is also in a form of a tube with a stepped configuration. The adjusting seat 2 is rotatably mounted inside the fixing seat 1, and is formed with two sets of spirally extending first driving slots 201, and a set of second driving slots 202 that extend spirally in a direction opposite to the first driving slots 201. A set of limiting components 203 is mounted on the adjusting seat 2 adjacent to the second driving slots 202, and extends into the limiting slots 102. The first driving slots 201 and the second driving slots 202 correspond to the guide slots 101. The front lens module 3 includes a sleeve 301 and a front lens set 302 mounted inside the sleeve 301. The sleeve 301 has a set of front guide components 303 passing through the second driving slots 202 and the guide slots 101, and is formed with a set of sliding slots 304. The front lens set 302 includes a set of guide components 305 that extends into the sliding slots 304. The rear lens module 4 includes first and second lens sets 401 and 402, each of which has a set of rear guide components 403 passing through the first driving slots 201 and the guide slots 101.

When a user rotates the adjusting seat 2, the front and rear lens modules 3 and 4 will move in the same or opposite directions along the axis for zooming adjustment by virtue of the second driving slots 202, the first driving slots 201, the guide slots 101, and the front and rear guide components 303 and 403. In another aspect, when the user rotates the front lens set 302, the focus is adjusted.

The aforementioned lens device has the functions of zoom and focus adjustments, and the design of the limiting slots 102 positions the adjusting seat 2 relative to the fixing seat 1 along the axis while limiting the range of angular rotation of the adjusting seat 2. However, the limiting slots 102 are required to be bored through the fixing seat 1, and a plurality of screw holes 203' are required to be bored through the adjusting seat 2 for fixing the limiting components 203. Therefore, the conventional lens device has many components and a complicated structure that result in a high cost of manufacturing and processing.

SUMMARY OF THE INVENTION

Therefore, the object of the present invention is to provide an adjustable lens device with fewer components, a simpler structure and a lower cost of processing.

Accordingly, an adjustable lens device of the present invention comprises a tubular fixing seat, a tubular adjusting seat, and first and second lens modules.

The fixing seat has a surrounding wall that surrounds an axis and that defines a through hole. The surrounding wall has a first end portion, a second end portion opposite to the first end portion along the axis, a guide slot formed between the first and second end portions and extending parallel to the axis, and a positioning projection projecting radially and outwardly from the surrounding wall.

The adjusting seat is sleeved on the fixing seat, is formed with a driving slot that extends spirally relative to the axis, and has an annular inner surface formed with an annular groove. The positioning projection is movably received in the annular groove so as to couple rotatably the adjusting seat to the fixing seat. The adjusting seat further has an end face formed with a notch that extends parallel to the axis, that extends to the annular groove, and that permits movement of the positioning projection into and out of the annular groove.

The first lens module is mounted to the first end portion of the surrounding wall of the fixing seat, and includes a first lens barrel and a set of first lenses mounted in the first lens barrel.

The second lens module is mounted in the second end portion of the surrounding wall of the fixing seat. The second lens module includes a second lens barrel, a set of second lenses mounted in the second lens barrel, and a guide component provided on the second lens barrel and passing through the guide slot in the fixing seat and the driving slot in the adjusting seat such that rotation of the adjusting seat relative to the fixing seat results in movement of the guide component along the guide slot and the driving slot to result in movement of the second lens module relative to the fixing seat along the axis.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
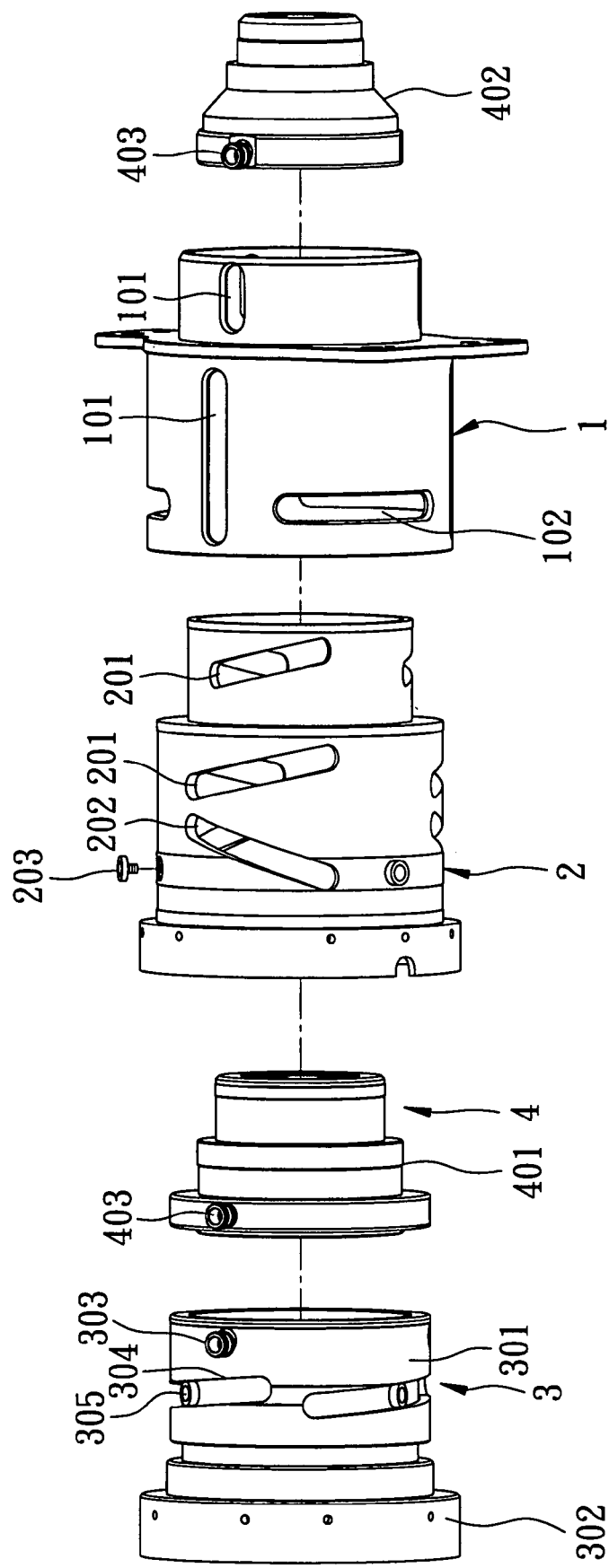
FIG. 1 is an exploded perspective view of a conventional lens device.
Figure 2:
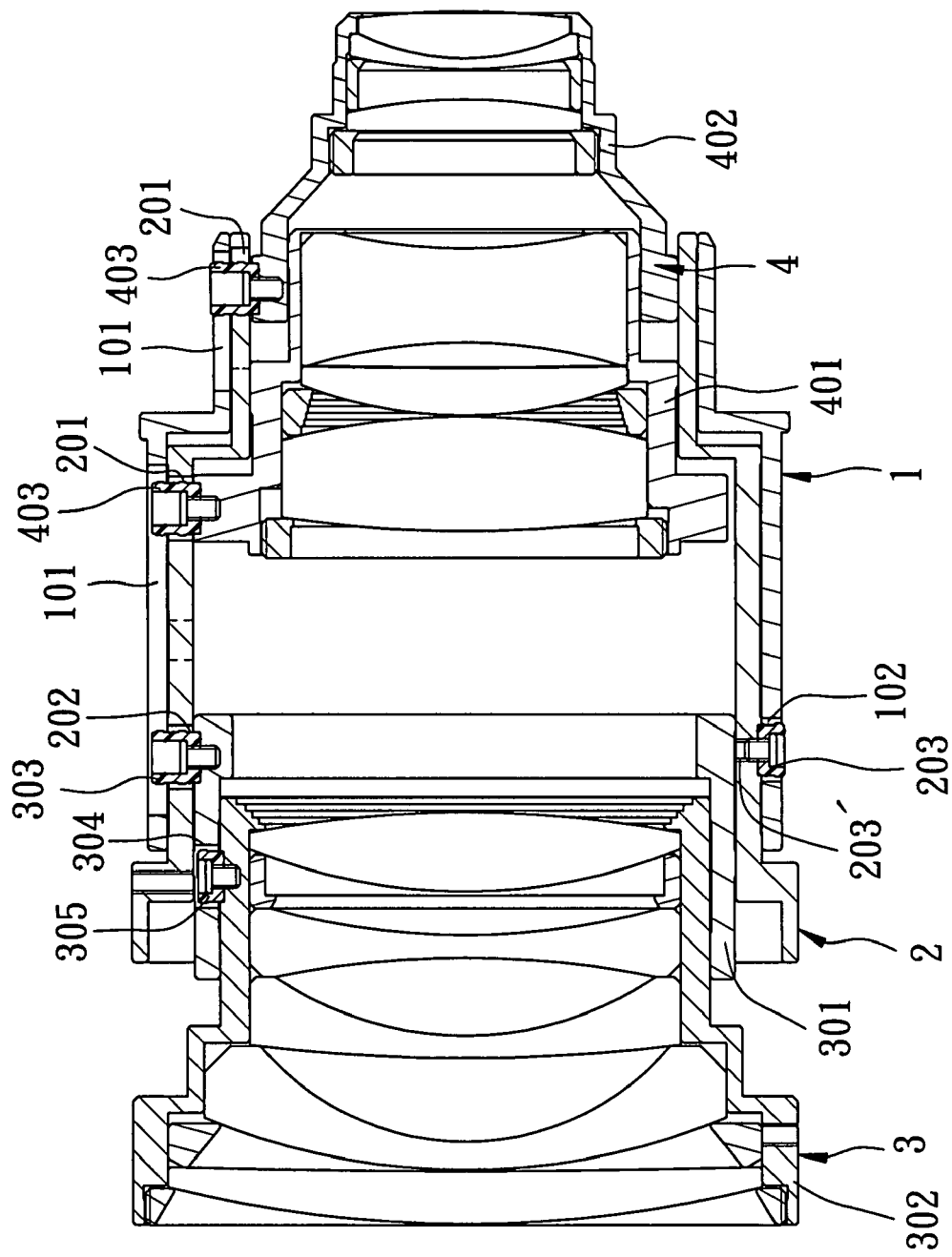
FIG. 2 is an assembled sectional view of the conventional lens device.
Figure 3:
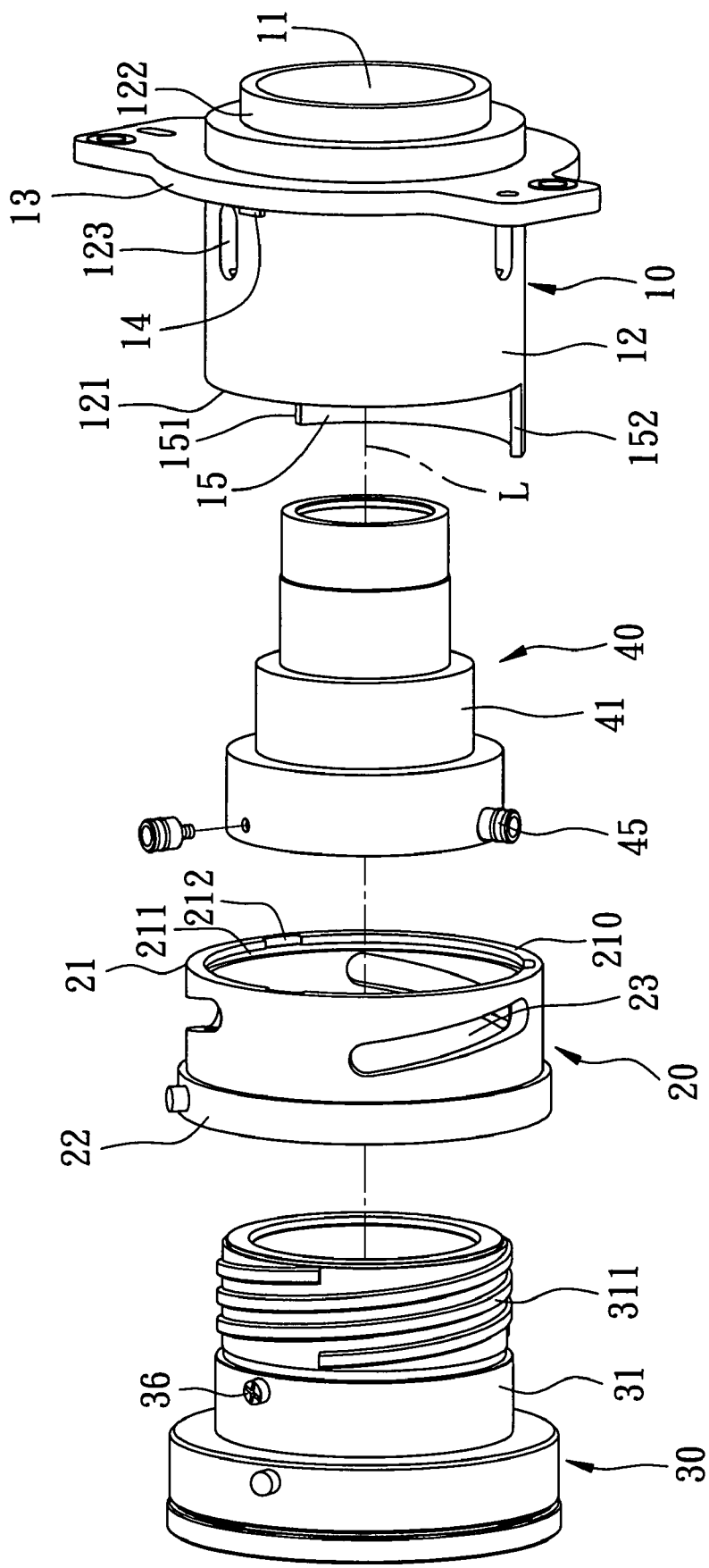
FIG. 3 is an exploded perspective view of a preferred embodiment of an adjustable lens device according to the invention.
Figure 4:
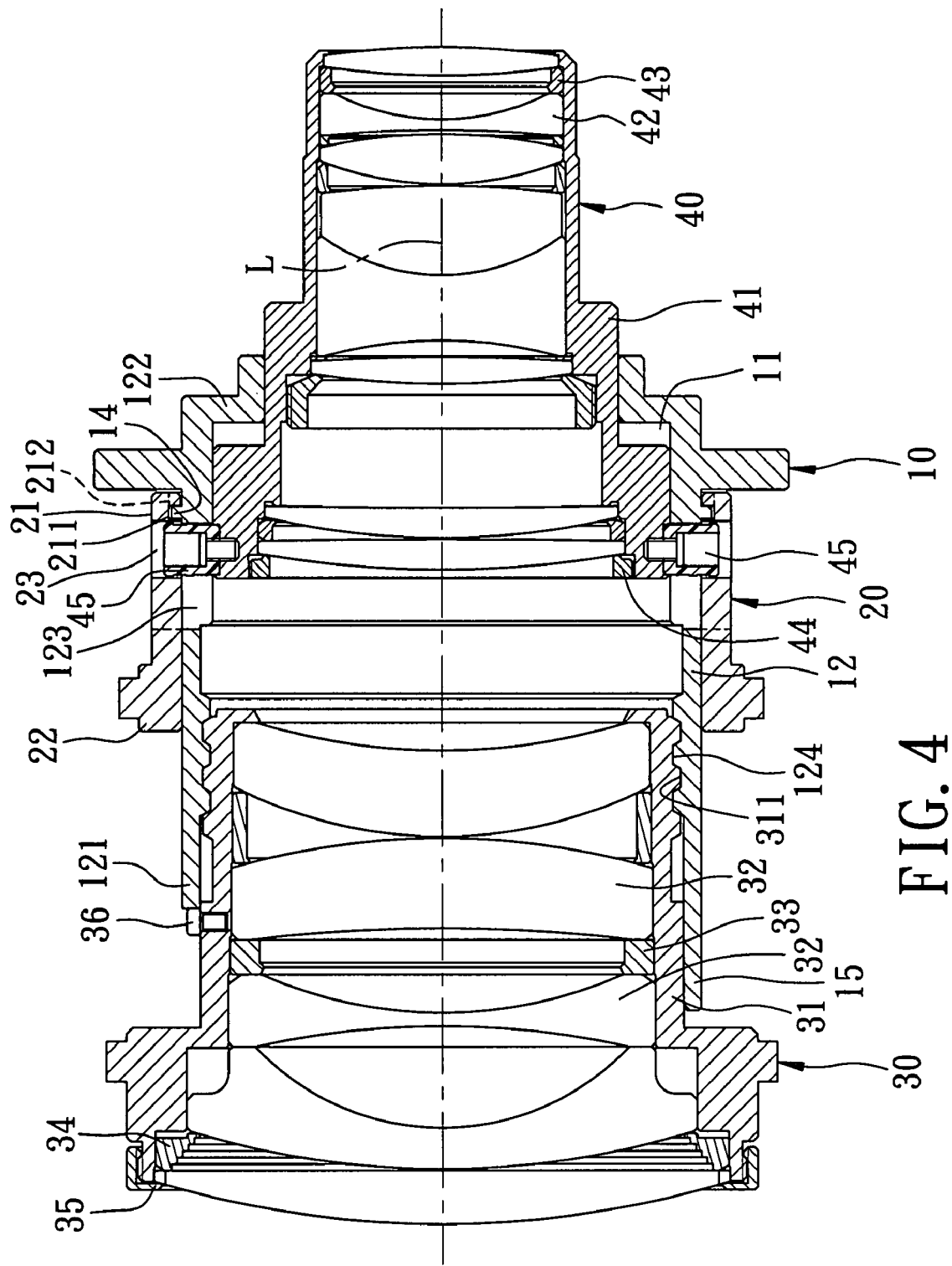
FIG. 4 is an assembled sectional view of the preferred embodiment.

As shown in FIGS. 3 and 4, the preferred embodiment of an adjustable lens device according to the present invention includes a fixing seat 10, an adjusting seat 20 sleeved on the fixing seat 10, a first lens module 30 mounted threadedly to the fixing seat 10, and a second lens module 40 mounted in the fixing seat 10.

The fixing seat 10 is tubular and has a surrounding wall 12 that surrounds an axis (L) and that defines a through hole 11. The surrounding wall 12 has a first end portion 121, a second end portion 122 opposite to the first end portion 121 along the axis (L), a plurality of guide slots 123 formed between the first and second end portions 121, 122 and extending parallel to the axis (L), and a plurality of angularly spaced apart positioning projections 14 (only one is visible in FIG. 3) projecting radially and outwardly from the surrounding wall 12. The first end portion 121 of the surrounding wall 12 has an inner wall surface formed with an internal thread 124. The second end portion 122 has a stepped configuration such that the dimensions of the through hole 11 are reduced in the direction away from the first end portion 121. The fixing seat 10 further has a fixing portion 13 that projects in radial outward directions from the surrounding wall 12 and that is spaced apart from the positioning projections 14 along the axis (L), and a limiting portion 15 that extends parallel to the axis (L) from the first end portion 121 of the surrounding wall 12. The limiting portion 15 has a first limiting edge 151 and a second limiting edge 152 that form an angle therebetween relative to the axis (L), and is in a form of a curved plate in this embodiment.

The adjusting seat 20 is also tubular and can be rotated limitedly relative to the fixing seat 10. The adjusting seat 20 is formed with a plurality of driving slots 23 that extend spirally relative to the axis (L) and has an annular inner surface formed with an annular groove 211. The positioning projections 14 are movably received in the annular groove 211 so as to couple rotatably the adjusting seat 20 to the fixing seat 10. The adjusting seat 20 further has an end face 210 formed with a plurality of notches 212 that extend parallel to the axis (L), that extend to the annular groove 211, and that permit movement of the positioning projections 14 into and out of the annular groove 211 when the positioning projections 14 are registered with the notches 212. The positioning projections 14 cooperate with the annular groove 211 to position the adjusting seat 20 relative to the fixing seat 10 along the axis (L) when the positioning projections 14 are staggered with the notches 212. In this embodiment, the adjusting seat 20 further has a positioning end portion 21 disposed adjacent to the fixing portion 13, and an operating end portion 22 opposite to the positioning end portion 21 along the axis (L). The driving slots 23 are formed between the positioning end portion 21 and the operation end portion 22. The positioning end portion 21 has an inner wall surface formed with the annular groove 211, and is further formed with the notches 212.

The first lens module 30 is a front optical lens module in this embodiment, and includes a first lens barrel 31 extending into the through hole 11 of the fixing seat 10 and formed with an external thread 311 to connect threadedly with the internal thread 124 on the first end portion 121 of the fixing seat 10, a set of first lenses 32 mounted in the first lens barrel 31, a plurality of first spacer rings 33 each disposed between an adjacent pair of the first lenses 32, a first press ring 34 mounted threadedly in the first lens barrel 31 for limiting the first lenses 32 along the axis (L), a protective cap 35 fixed to the first lens barrel 31 and disposed outwardly of the press ring 34, and a limiting component 36 in the form of screws provided on the first lens barrel 31 and cooperating with the first and second limiting edges 151, 152 of the limiting portion 15 to limit range of angular rotation of the first lens module 30 relative to the fixing seat 10. Due to the threaded engagement between the external thread 311 and the internal thread 124, the first lens module 30 is adjustable relative to the fixing seat 10 along the axis (L).

The second lens module 40 is a rear optical lens module in this embodiment, and is mounted in the second end portion 122 of the fixing seat 10. The second lens module 40 includes a second lens barrel 41, a set of second lenses 42 mounted in the second lens barrel 41, a plurality of second spacer rings 43 each disposed between an adjacent pair of the second lenses 42, a second press ring 44 mounted threadedly in the second lens barrel 41 for limiting the second lenses 42 along the axis (L) and a plurality of guide components 45 provided on the second lens barrel 41 and passing through the guide slots 123 in the fixing seat 10 and the driving slots 23 in the adjusting seat 20. The second lens barrel 41 also has a stepped configuration to correspond with the second end portion 122 of the surrounding wall 12 of the fixing seat 10.

As shown in FIGS. 3 and 4, when the lens device is assembled, the second lens module 40 is in the fixing seat 10, and the adjusting seat 20 is sleeved on the fixing seat 10. The guide components 45 pass through the driving slots 23 and the guide slots 123, and the positioning projections 14 are received in the annular groove 211 to position the adjusting seat 20 relative to the fixing seat 10 along the axis (L). By virtue of the driving slots 23 and the guide components 45, the range of angular rotation of the adjusting seat 20 relative to the fixing seat 10 is limited thereby.

Figure 5:
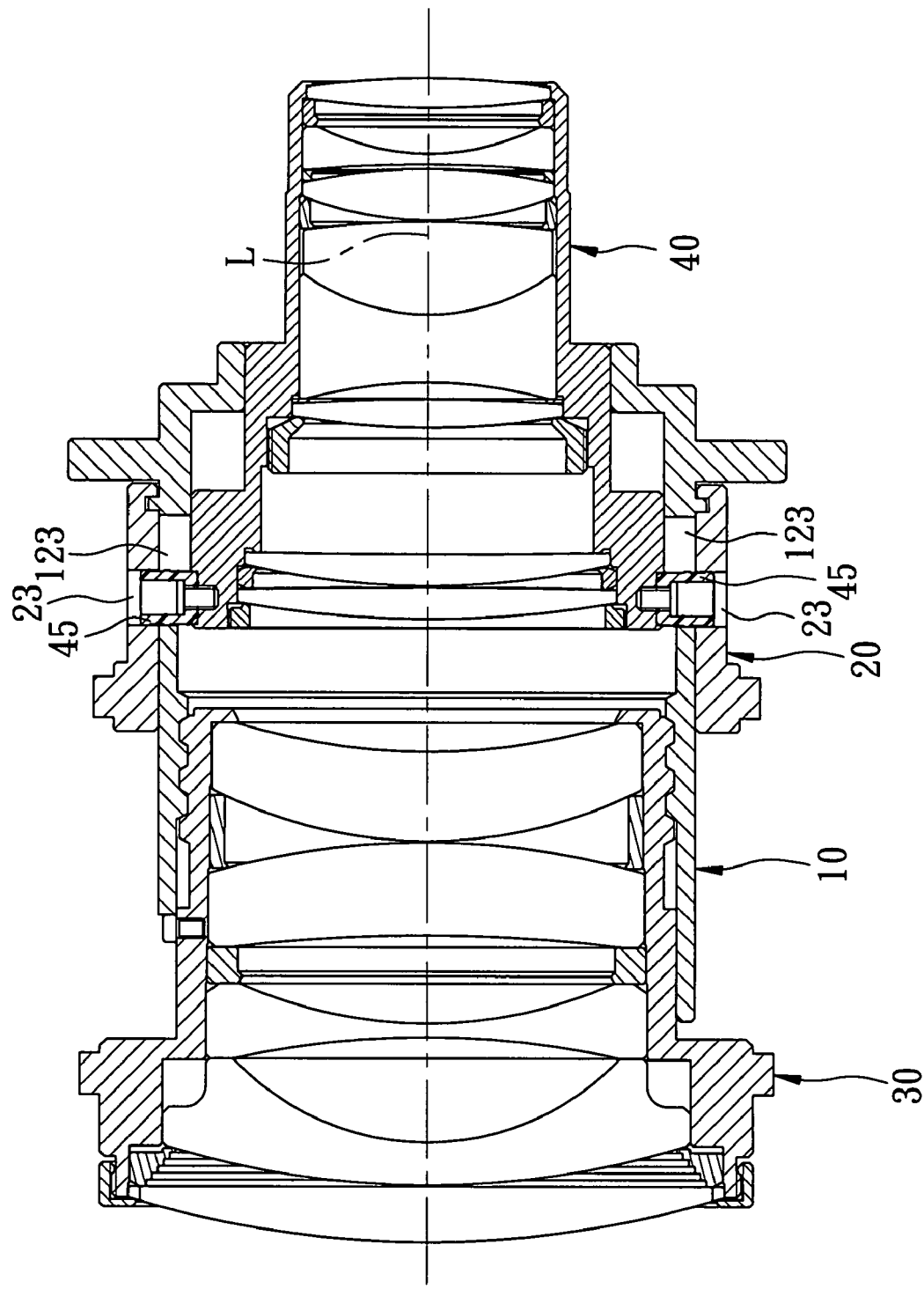
FIG. 5 is a view similar to FIG. 4 but illustrating the preferred embodiment after zoom adjustment.

As shown in FIG. 5, since the driving slots 23 extend spirally, the guide slots 123 extend parallel to the axis (L), and the guide components 45 pass through the driving slots 23 and the guide slots 123, rotation of the adjusting seat 20 relative to the fixing seat 10 results in movement of the second lens module 40 relative to the first lens module 30 along the axis (L) for zoom adjustment.

Therefore, according to the lens device of the present invention, the adjusting seat 20 is positioned relative to the fixing seat 10 along the axis (L) through the positioning projections 14 in the annular groove 211, and the range of angular rotation of the adjusting seat 20 relative to the fixing seat 10 is limited by the driving slots 23 and the guide components 45. Compared to the use of the limiting slots 102 and the screw holes 203' in the prior art, the structures of the positioning projections 14 and the annular groove 211 in the present invention are simpler, the manufacturing and assembling procedures in the present invention are easier, and the manufacturing and processing costs are lower.

It should be noted that, while this invention is exemplified using a plurality of guide slots 123, a plurality of positioning projections 14, a plurality of notches 212, a plurality of driving slots 23, and a plurality of guide components 45, only one guide slot 123, one positioning projection 14, one notch 212, one driving slot 23, and one guide component 45 may be employed in other embodiments of this invention. Moreover, while the second lens module 40 is moved relative to the fixing seat 10 for zoom adjustment in this embodiment, it is possible to enable movement of the first lens module 30 relative to the fixing seat 10 using the same structural connection between the second lens module 40 and the fixing seat 10 to achieve the same effect. Furthermore, while the first lens module 30 is connected threadedly to the fixing seat 10 in this embodiment, it is possible to form additional driving slots in the adjusting seat 20 and to provide guide components on the first lens module 30 so that rotation of the adjusting seat 20 relative to the fixing seat 10 results in movement of the first and second lens module 30, 40 toward each other or in opposite directions to achieve the effect of zoom adjustment.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An adjustable lens device comprising:
   a tubular fixing seat having a surrounding wall that surrounds an axis and that defines a through hole, said surrounding wall having a first end portion, a second end portion opposite to said first end portion along the axis, a guide slot formed between said first and second end portions and extending parallel to the axis, and a positioning projection projecting radially and outwardly from said surrounding wall;

a tubular adjusting seat sleeved on said fixing seat, said adjusting seat being formed with a driving slot that extends spirally relative to the axis and having an annular inner surface formed with an annular groove, said positioning projection being movably received in said annular groove so as to couple rotatably said adjusting seat to said fixing seat, said adjusting seat further having an end face formed with a notch that extends parallel to the axis, that extends to said annular groove and that permits movement of said positioning projection into and out of said annular groove;

a first lens module mounted to said first end portion of said surrounding wall of said fixing seat, said first lens module including a first lens barrel and a set of first lenses mounted in said first lens barrel; and a second lens module mounted in said second end portion of said surrounding wall of said fixing seat, said second lens module including a second lens barrel, a set of second lenses mounted in said second lens barrel, and a guide component provided on said second lens barrel and passing through said guide slot in said fixing seat and said driving slot in said adjusting seat such that rotation of said adjusting seat relative to said fixing seat results in movement of said guide component along said guide slot and said driving slot to result in movement of said second lens module relative to said fixing seat along the axis.

2. The adjustable lens device as claimed in claim 1, wherein said fixing seat further has a fixing portion projecting in radial outward directions from said surrounding wall and spaced apart from said positioning projection along the axis.

3. The adjustable lens device as claimed in claim 2, wherein said adjusting seat further has a positioning end portion disposed adjacent to said fixing portion, and an operating end portion opposite to said positioning end portion along the axis, said driving slot being formed between said positioning end portion and said operating end portion, said positioning end portion being formed with said annular groove and said notch.

4. The adjustable lens device as claimed in claim 1, wherein said first end portion of said surrounding wall of said fixing seat has an inner wall surface formed with an internal thread, said first lens barrel of said first lens module extending into said through hole of said fixing seat and being formed with an external thread to connect threadedly with said internal thread on said first end portion of said surrounding wall.

5. The adjustable lens device as claimed in claim 4, wherein said fixing seat further has a limiting portion extending parallel to the axis from said first end portion of said surrounding wall, said limiting portion having a first limiting edge and a second limiting edge that form an angle therebetween relative to the axis, said first lens module further including a limiting component provided on said first lens barrel and cooperating with said first and second limiting edges of said limiting portion to limit range of angular rotation of said first lens module relative to said fixing seat.

6. The adjustable lens device as claimed in claim 5, wherein said limiting portion is in a form of a plate, and said limiting component is a screw.

7. The adjustable lens device as claimed in claim 1, wherein:

said first lens module further includes at least one first spacer ring disposed between an adjacent pair of said first lenses, and a first press ring mounted in said first lens barrel for limiting said first lenses along the axis; and said second lens module further includes at least one second spacer ring disposed between an adjacent pair of said second lenses, and a second press ring mounted in said second lens barrel for limiting said second lenses along the axis.

8. The adjustable lens device as claimed in claim 1, wherein said first lens module is a front optical lens module, and said second lens module is a rear optical lens module.

* * * * *